3,233,479
MACHINE TOOL
Donald Everhart, Utica, and Robert L. Munn, Warren, Mich., assignors to The Cross Company, Detroit, Mich., a corporation of Michigan
Filed June 18, 1964, Ser. No. 376,081
10 Claims. (Cl. 77—1)

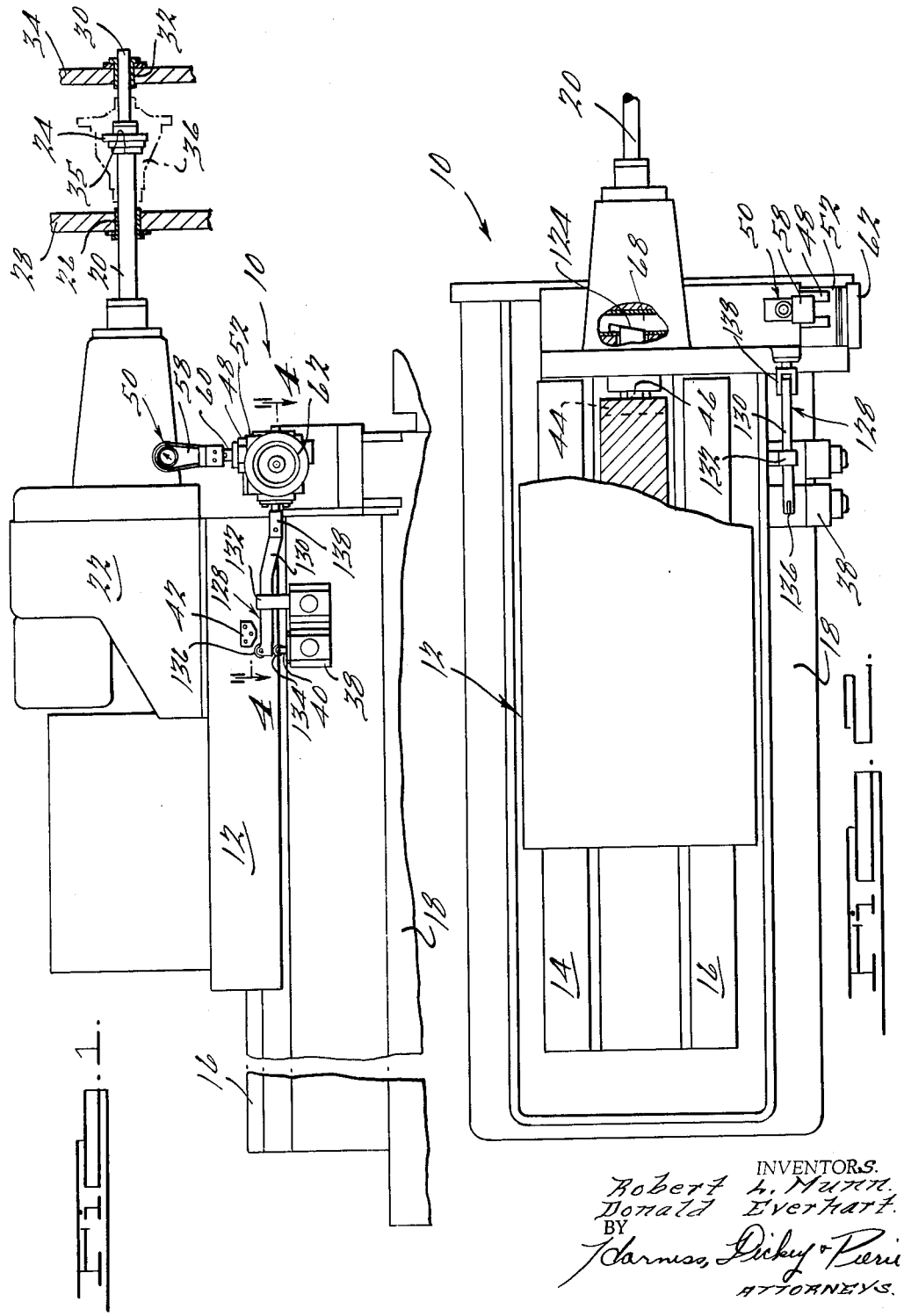

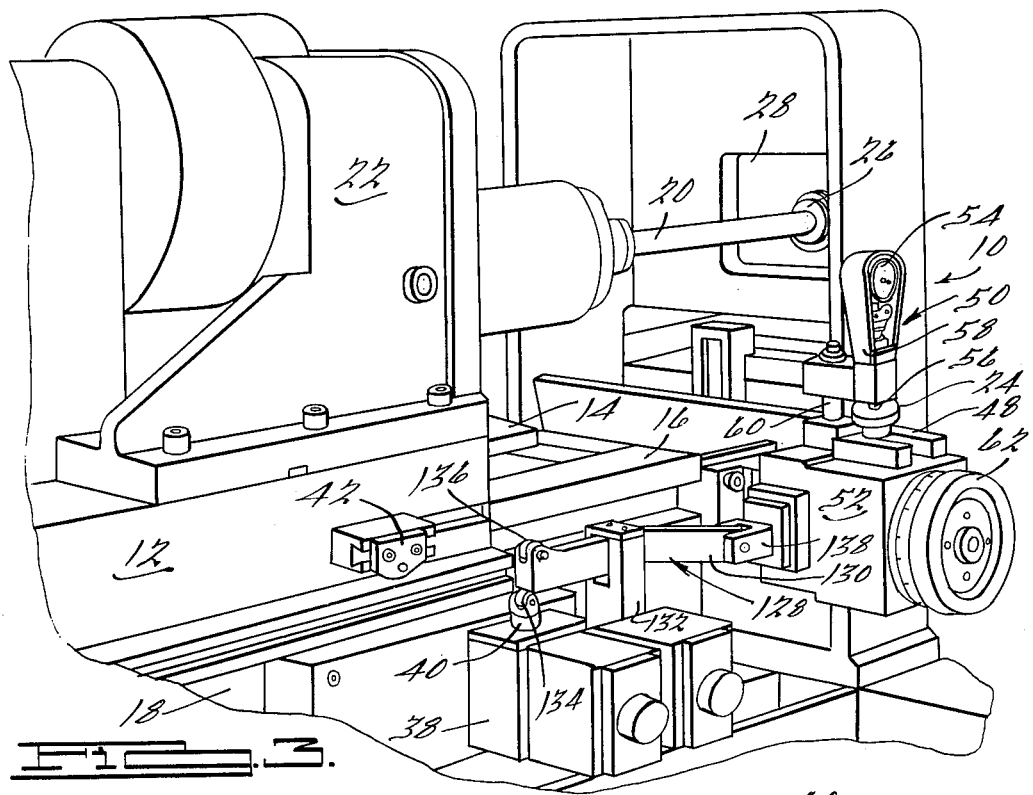
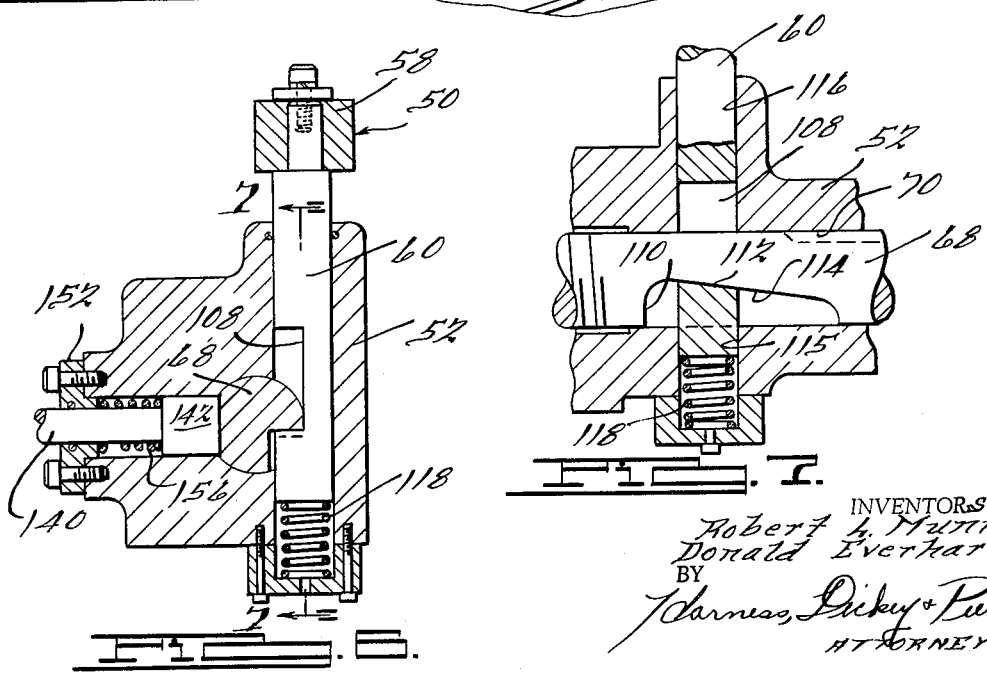

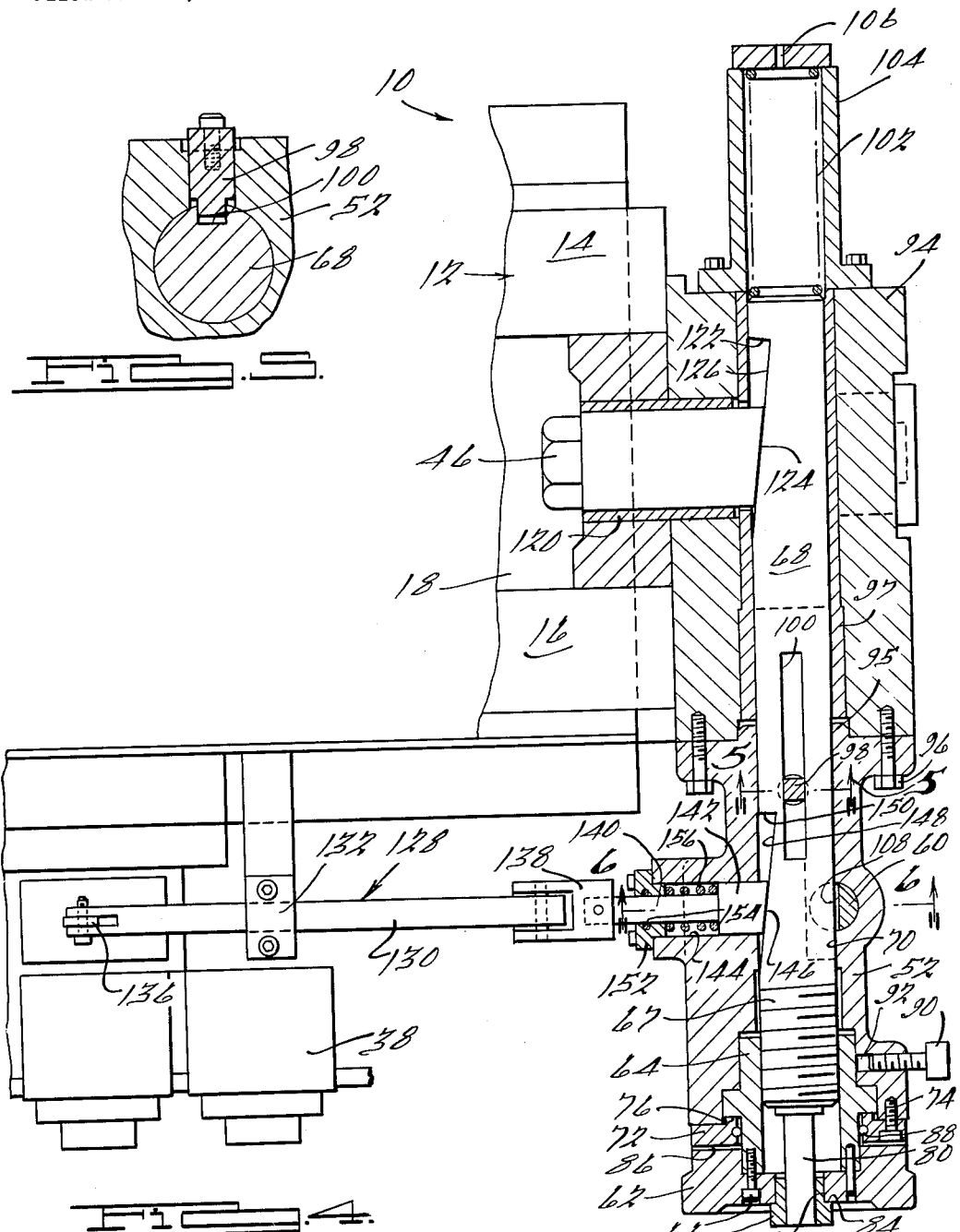

This invention relates broadly to machine tools of the type having a tool carrying slide and more particularly to means adapted for use on the machine for indicating the effective length of the tool carried by the slide and for adjusting and positioning the positive stop that limits forward movement of the slide and also, if desired, the feed dog arrangement that controls the traverse and feed movements of the slide automatically in accordance with the indicated effective length of the tool.

As indicated above, an important object of the present invention is to provide a machine tool of the above-mentioned character with means for checking and indicating the effective length of a tool prior to use thereof in the machine and that automatically adjusts the forward positive stop for the tool slide to bring the cutting edge of the tool precisely to a predetermined position in the work and, if desired, also correspondingly changes the traverse stroke of the slide to assure a minimum cycle time for the machine all automatically in accordance with the indicated effective length of the tool.

Another object of the invention is to provide an apparatus of the above-mentioned character in which the forward stop and feed dog adjustments are made automatically at the time the tool to be placed in the machine is checked.

Still another object of the invention is to provide an apparatus of the above-mentioned character wherein the forward stop and feed dog adjustment features can be used together or independently as desired in accordance with the exigencies of the particular situation.

Other objects and advantages of the invention will be apparent during the course of the following description:

In the drawing, forming a part of this specification, and wherein like numerals are employed to designate like parts throughout the same, FIGURE 1 is a fragmentary, side elevational view of a machine tool showing a typical known form of tool slide and related portions thereof and illustrating the novel apparatus of this invention in operative association therewith;

FIGURE 2 is a top plan view of the same;

FIGURE 3 is a fragmentary perspective view thereof;

FIGURE 4 is an enlarged, fragmentary, horizontal sectional view taken on the line 4—4 of FIGURE 1;

FIGURE 5 is a fragmentary, transverse sectional view taken on the line 5—5 of FIGURE 4;

FIGURE 6 is a fragmentary, transverse sectional view taken on the line 6—6 of FIGURE 4; and FIGURE 7 is a fragmentary sectional view taken on the line 7—7 of FIGURE 6.

The device of this invention is here shown associated with a machine tool 10 having a tool carrying slide 12 of a conventional type mounted for reciprocable sliding movement on the ways 14 and 16 of a suitable stationary base 18. A rotatably driven arbor 20 forming a part of the drive head 22 on the slide 12 carries a cutting tool 24 and, in the particular form of machine here shown the arbor is journaled for rotation and slidably supported by a bushing 26 in the rear bushing support 28. A pilot 30 on the forward end of the arbor 20 is slidably and rotatably supported by a bushing 32 on the front bushing support 34. In this particular arrangement, the cutter 24 is a boring and spot facing tool, and the tool is connected by splines or the like for mutual rotation with the arbor 20 but is free to move axially thereon within limits. In practice, as the slide 12 and head 22 move forwardly, a shoulder 35 on the arbor 20 picks up the cutter 24 and pushes it into the workpiece 36 and against an internal radial face thereof to machine finish it.

It is contemplated that the tool slide 12 be advanced and retracted on the ways 14 and 16 in any suitable or conventional way. While means for moving the slide 12 is not actually shown, it is assumed for the purpose of this description that it is actuated by a hydraulic cylinder in the usual manner and that flow of hydraulic liquid to and from the cylinder is controlled by suitable valve means according to standard practice. A valve 38 forming a part of the control valve assembly is here shown mounted on the base 18 with the operating stem 40 thereof extending upwardly for operation by a traveling dog 42 on the slide 12.

In the operation of machines of this type, the usual practice is to start the slide 12 forward by means of a suitable manual or automatic control (not shown). During the initial or traverse portion of the forward movement, the slide 12 travels at a relatively high rate of speed and the cutter 24 is moved up to a position proximate to the work 36. However, just before the cutter 24 actually engages the work 36, the dog 42 operates the valve stem 40 and positions the valve 38 to meter the flow of hydraulic liquid to the slide actuating cylinder at a reduced rate. This slows the forward travel of the slide 12 to bring the cutter 24 against the work 36 at a relatively slow feed rate which continues until an abutment 44 at the forward end of the slide engages a positive stop 46. If it is assumed that the cutter 24 is to perform a spot facing operation on the work 36, it will be readily apparent that the cutter will move into the work until the abutment 44 engages the stop 46. In many work situations of this type, the cutter here shown (as well as many other types of cutters) must work to a close tolerance and the stop 46 therefore must be set accurately to control and limit forward movement of the slide 12. After the cutter 24 has completed its operation, flow of hydraulic liquid to the slide cylinder is reversed and the slide 12 is retracted to its initial or starting position.

From the foregoing it will be readily appreciated that the machine tool components here shown and described are conventional in construction and operation and that the machining operation described in connection with the machine is given by way of example only. In actual practice, the machine tool may be of various forms and kinds and it can vary widely in the number and kinds of operations performed thereby. It is contemplated that the appurtenant apparatus of this invention be used on any machine tool where it has utility and it is not intended that use of the apparatus be limited in any way to the particular form of machine tool here shown or in connection with any special or particular kind of cutting operation. In general, there is a need for the apparatus of this invention wherever a cutter is required to advance to a predetermined point, where this point must be accurately controlled, and where the effective length of the cutter changes or varies from time to time due to sharpening or resetting of the cutter blades or to other factors. The instant apparatus provides means for determining the effective length of cutter before it is mounted on the machine and functions automatically while the cutter is being measured to position or adjust the forward stop 46 in accordance with the determined effective length of the cutter. In this manner the cutter is stopped precisely at the desired point in the work regardless of variations in the length of the cutter and the end position of the latter is constant regardless of changes in the length of the cutter due to sharpening or resetting of the cutter blades or to other factors that affect or change its length.

More particularly, the apparatus of this invention comprises a tool support 48 and a tool checking gauge assembly 50 both carried by a suitable housing 52 here shown at the side and directly in front of the base 18. It is contemplated that the above apparatus be located either on the base 18 as shown or on the slide 12, but it preferably is disposed at the front end of the base 18 and conveniently close to the tool 24. Also, for reasons hereinafter apparent, this apparatus preferably is disposed in proximity to the hydraulic valve 38 and to the dog 42. The tool support 48 may have any suitable or convenient form that will accommodate a tool 24' to be used on the arbor 20 and that will position the tool in operative association with the gauge assembly 50. The particular block here shown has a flat, top tool-supporting surface and is generally U-shaped in plan.

In use, the cutter 24' is placed on the supporting block 48 directly under the gauge assembly 50. The latter, as shown, has a conventional dial indicator 54 that is operated by a tool contacting finger or element 56 in the conventional manner and is disposed directly over the support 48. By reason of this relationship, vertical bodily movements of the gauge assembly 50 will bring the element 56 into contact with the top surface of a tool 24' disposed on the support 48. Both the dial indicator 54 and the element 56 are contained in a suitable case 58 that is carried for vertical bodily adjustment by a rod 60 slidably mounted in the housing 52.

Vertical adjustment of the gauge assembly 50 in the manner described is accomplished by a manually operable and rotatable graduated dial 62 on the front of the housing 52. As perhaps best shown in FIGURE 4, the dial 62 is fastened to a sleeve 64 by screws 66, and the inner or rearward portion of the sleeve is internally threaded to receive the externally threaded outer end 67 of a wedge shaft 68 slidably mounted in the horizontal bore 70 of the housing 52. A retaining ring 72 fastened to the forward or outer end of the housing 52 by screws 74 extends radially inwardly of the housing and is closely received between a radial outwardly facing shoulder 76 on the sleeve 64 and the rear or inner face of the dial 62. Also, a bushing 78 mounted on a pin 80 fixed to and extending outwardly from the wedge shaft 68 is closely but rotatably received in a central opening 82 provided in the dial 62. The radial shoulder 76 seating forwardly on the retainer ring 72 and a radial shoulder 84 on the bushing 78 which seats rearwardly against the dial 62 holds the latter and the sleeve 64 against axial movement while permitting both the sleeve and the dial to rotate freely in the housing 52. Clearance preferably is provided at 86 between the dial 62 and the retainer 72 to minimize frictional resistance to rotation of the dial, and an O-ring seal 88 is provided between the sleeve 64 and the retaining ring 72. A set screw 90 in the housing 52 is tightened against a block 92 of nylon or the like which bears on the sleeve 64 to hold the dial assembly securely in a selected rotatably adjusted position. From the foregoing, it will be readily apparent that rotation of the dial 62 either advances or retracts the wedge shaft 68 in the housing 52 depending on the direction of rotation of the dial.

It will be observed also (FIGURE 4) that the wedge shaft 68 extends rearwardly from the housing 52 into a second housing 94 which conveniently can be mounted on and fastened to the front end of the base 18 directly behind the housing 52. Also, the front housing 52 is piloted in the rear housing 94 at 95 and the two housings are fastened securely together by screws 96 or the like. A sleeve bushing 97 in the rear housing 94 slidably supports the rearwardly extending portion of the wedge shaft 68. As shown in FIGURE 5, a guide 98 extending radially through the housing 52 and into the bore 70 has the projecting inner end thereof closely but slidably received in a longitudinal way 100 in the shaft 68 to keep the latter from turning with the dial 62 while at the same time permitting it to move axially back and forth upon rotation of the dial. A compression spring 102 confined in a cylindrical cup 104 mounted on the rear housing 94 bears on the inner end of the wedge shaft 68 to hold the internal and external threads that actuate the shaft tight at all times and to take backlash out of the movement of the shaft. A vent 106 in the end of the cup 104 prevents air from being trapped in the cup and affecting operation of the wedge shaft 68.

In order to transmit motion from the wedge shaft 68 to the tool checking gauge assembly 50, the gauge carrying rod 60 is positioned to intersect the bore 70 at right angles and the intersecting portion of the rod is formed with a lateral recess 108 which accommodates a portion of the shaft 68 (FIGURES 6 and 7). Wedge shaft 68 similarly is provided with a longitudinal recess 110 that receives and interfits with the gauge rod 60, and a laterally inclined cam surface 112 of the recess 108 seats against a correspondingly inclined cam surface 114 of the recess 110. From the foregoing, it will be apparent that movement of the wedge shaft 68 to the left as viewed in FIGURE 7 cams the gauge rod 60 downwardly; and, conversely, movement of the shaft 68 to the right permits the gauge rod 60 to move upwardly. In this connection it will be observed also that the gauge rod 60 extends below the bore 70 and into a lower extension 115 of the bore 116 through which the rod extends into the housing 52. In this manner, the rod 60 is slidably supported at both sides of the wedge shaft 68. A compression spring 118 confined in the bore 115 below the rod 60 holds the two cam surfaces 112 and 114 together at all times. As a consequence, the gauge rod 60 is forced downwardly to compress the spring 118 by the interacting cam faces 112 and 114 when the shaft 68 moves to the left in FIGURE 7; and, when the wedge shaft 68 is moved again to the right to release the rod 60, the compression spring 118 raises the rod 60 and the gauge assembly 50 carried thereby.

Provision is made also for transferring motion from the wedge shaft 68 to the forward positive stop 46. As shown in FIGURE 4, the stop 46 is mounted for axial sliding movement in a bushing 120 in horizontal alignment with the wedge shaft 68. The inner end of the stop 46 projects into a longitudinal recess 122 in the shaft 68 and is tapered as at 124 to complement a correspondingly tapered cam surface 126 at the bottom of the recess. Manifestly, movement of the wedge shaft 68 toward the spring 102 causes the cam surface 126 to push the stop 46 to the left as viewed in FIGURE 4 whereby to shorten or reduce the forward movement of the slide 12 on the base 18. Conversely, movement of the wedge shaft 68 away from the spring 102, disengages the cam surface 126 from the stop 46 and permits the latter to move to the right as viewed in the drawing. It will be apparent that, as the slide 12 will continue to advance until further movement is prevented by the stop 46, the latter is pushed against the wedge shaft 68 each time the slide 12 moves to the forward limit of its travel and the position of the wedge shaft thus determines the forward terminal position of the slide. Thus, movement of the wedge shaft 68 away from the spring 62 in effect advances or extends the forward travel of the slide 12.

In order to maintain the cycle time of the tool slide 12 at a minimum, it is desirable also to control operation of the valve 38 by the wedge shaft 68 so that the point at which the slide changes from traverse motion to feed motion is coordinated with the operation of the tool checking gauge assembly 50 and with the position of the forward positive stop 46. According to the present invention, this is accomplished by interposing a valve actuating element 128 between the hydraulic valve 38 and the valve actuating dog 42. More particularly, the valve actuating element 128 is in the form of an elongated arm 130 which extends horizontally above the valve 38 and is supported for limited horizontal reciprocatory movement by a suitable guide 132 mounted on the base 18 behind or beside the valve. One end of the arm 130 rests upon the valve actuating stem 40 and the latter preferably is equipped with the usual roller 134 which directly supports the arm and facilitates lateral sliding movement thereof. Also, the arm 130 in turn carries a small roller 136 which is positioned for engagement by the dog 42. Manifestly, the valve 38 is mounted lower on the base 18 with respect to the actuating dog 42 than normally would be the case in order to accommodate the arm 130 therebetween. In practice, the dog 42 engages the roller 136 as the slide 12 moves forwardly to the end of its traverse movement; and, as the dog overrides the roller 136, it depresses the arm 130 and with it the valve stem 40 to actuate the valve 38 so as to meter the flow of hydraulic liquid to the slide cylinder at a reduced rate and thereby to slow the forward motion of the slide to the feed rate.

The opposite end of the arm 130 is pivoted to a yoke 138 having a shank portion 140 which carries a wedge block 142. As perhaps best shown in FIGURE 4, the shank 140 and wedge block 142 extend into the housing 52 through a lateral opening 144 disposed transversely and in alignment with the wedge shaft 68. At its near end the wedge block 142 has a tapered cam face 146 that seats on the correspondingly tapered bottom face 148 of a cam recess 150 in the shaft 68. The outer end of the opening 144 is closed by a suitable plug 152, and the annular space between the shank 140 and the plug is sealed by an O-ring 154. Confined between the wedge block 142 and the plug 152 is a compression spring 156 that holds the block against the shaft 68 at all times so that the block follows the tapered cam surface 148 when the wedge shaft 68 is slidably actuated in the manner hereinabove described.

The machine operator uses the apparatus of this invention whenever the cutter 24 becomes worn or dull and needs to be replaced. The first thing he does is to turn the dial 62 as required to advance the wedge shaft 68 sufficiently to raise the tool checking assembly 50 far enough to accommodate the substitute cutter 24' between the support 48 and the tool contacting element 56. The substitute cutter 24' is then inserted into the space between the support 48 and the tool checking gauge assembly 50 with the cutter resting on the support and directly below the tool contacting element 56. In practice, the tool or cutter 24' can be placed with the blades either upwardly or downwardly. As a practical matter, however, the position of the cutter 24' on the support 48 will be determined by the particular kind of cutter being checked. In most instances, the cutter will be placed with the blades extending downwardly and resting on the support 48 and the backup surface of the cutter positioned for engagement by the tool contacting element 56. This completes the initial set-up and loading operation.

The operator then turns the dial 62 in a reverse direction to retract the wedge shaft 68; and, as the shaft retracts, it lowers the tool checking gauge assembly 50 to bring the tool contacting element 56 into engagement with the tool 24'. The operator continues to retract the wedge shaft 68 until the indicator hand of the gauge 54 reaches a zero position on the dial of the gauge. This assures uniform positioning of the wedge shaft 68 for all tool checking operations and identical correlation of the parts and sub-assemblies actuated thereby each time the equipment is operated. Of course the final position of the wedge shaft 68 as determined by the tool checking gauge assembly 50 varies in difficult operation in accordance with the effective length of the tool being checked. In any event, however, the final position of the wedge shaft 68 determines the position of the forward positive stop 46 and also of the valve actuating element 128.

Manifestly, if the effective length of the substitute cutter 24' being checked is less than the cutter 24 in the machine, it will be necessary to retract the wedge shaft 68 farther than was required when the cutter in the machine was checked in order to bring the element 56 properly into engagement with the cutter. The additional movements thus imparted to the wedge shaft 68 permits the forward stop 46 to advance a corresponding amount and also moves the valve actuating element 128 a similar amount to the right as viewed in FIGURE 1 to correspondingly extend the traverse motion of the slide 12. Conversely, if the effective length of the substitute cutter 24' is greater than the cutter 24 in the machine, the final position of the wedge shaft 68 is more advanced than it was when the machine cutter was checked and accordingly the position of the forward positive stop 46 is adjusted to shorten the forward stroke of the slide 12 a corresponding amount and the valve actuating element 128 is similarly adjusted to shorten the traverse stroke of the slide. As a result, in the operation of the machine tool, the slide 12 feeds every cutting tool on the arbor 20 to the exact same point in the work 36 regardless of variations in the length of the tool, and this is necessarily true as the movement of the slide in every instance is determined directly from the cutter 24 used in the machine. Further, all adjustments are made automatically at the time the effective length of the cutter is determined to accommodate differences in cutter lengths and to maintain close tolerances on the workpiece regardless of the particular cutter length. As a result, it is possible to grind back cutters without resetting the blades and thus obtain the maximum usage of the cutter at the lowest possible cost, and simultaneous adjustment of the forward positive stop 46 and of the valve operating member 128 maintains a minimum cycle time for the machine.

What is claimed is:

1. In a machine tool of the type having an advanceable and retractable tool carrying slide,
   a support for mounting a tool of the type used by said slide;
   a movable tool checking device adjacent to said support and engageable with a tool disposed thereon for indicating the effective length of said tool;
   an adjustable stop disposed in the path of travel of said slide and engageable thereby to limit advancement thereof; and
   means for moving said tool checking device into and out of engagement with a tool on said support and operatively connected to said stop for adjustably moving the latter to control forward movement of said slide in accordance with the indicated length of said tool.

2. In a machine tool of the type having a base and an advanceable and retractable tool carrying slide on said base,
   a support for mounting a tool of the type used by the slide;
   a tool checking device adjacent to said support engageable with a tool disposed on the support for indicating the effective length of said tool;
   an adjustable stop carried by the base in the path of travel of said slide and engageable by the slide to limit advancement thereof; and
   manual actuator means operatively connected to said tool checking device for moving the latter bodily relative to said support and into engagement with a tool on said support whereby to determine the effective length of said tool and also operatively connected to said adjustable stop to retract the latter and thus correspondingly extend advancement of said slide simultaneously with and in direct proportion to movement of said tool carrying device toward said support.

3. In a machine tool of the type having an advanceable and retractable tool carrying slide, a stationary support for mounting a tool of the type used by said machine tool;

a tool checking device mounted to move relative to said support and engageable with a tool disposed thereon for indicating the effective length of said tool;

an adjustable stop disposed in the path of travel of said slide and engageable thereby to limit forward movement thereof;

manual actuator means; and coordinating means actuatable by said manual actuating means and operatively connected to said tool checking device and to said adjustable stop for imparting linear movement to said tool checking device toward and from said support and simultaneous equal linear movement to said adjustable stop in the direction of travel of said slide, said coordinating means adapted to retract said stop to correspondingly extend the forward movement of said slide as said tool checking device moves toward said support and conversely adapted to advance said stop to correspondingly reduce the forward movement of said slide as said tool checking device moves away from said support.

4. In a machine tool of the type having an advanceable and retractable tool carrying slide, means for controlling feed and traverse movements of said slide including an adjustable member for regulating the lengths of the feed and traverse movements;

a stationary support means for mounting a tool of the type used by the slide;

a tool checking device near said support movable into and out of engagement with a tool disposed thereon for indicating the effective length of said tool;

an adjustable stop disposed in the path of travel of said slide and engageable thereby to limit advancement thereof; and means for moving said tool checking device into and out of engagement with a tool on said support, said last mentioned means being operatively connected to said adjustable member and to said stop for moving the same to regulate the feed and traverse movement of said slide and to control forward movement of the slide in accordance with the indicated length of said tool.

5. In a machine tool of the type having a stationary base, an advanceable and retractable tool carrying slide on said base, and means for controlling the feed and traverse movements of said slide including actuator means on and movable with said slide and fixed actuated means on said base, the improvements comprising a tool support for mounting a tool of the type used by the slide;

a tool checking device adjacent to said support engageable with a tool disposed on the support for indicating the effecting lengths of said tool;

an adjustable stop carried by the base in the path of travel of said slide and engageable by the slide to limit advancement thereof;

a moveable member interposed between said actuator means and said actuated means adjustable to control the feed and traverse movements of the slide; and manual actuator means operatively connected to said tool checking device for moving the latter bodily relative to said support and into engagement with a tool on said support to determine the effective length of said tool, said manual actuator means being also operatively connected to said stop and to said movable member to adjust the same simultaneously with said tool checking device and particularly to retract the stop and said movable member and thus correspondingly extend the traverse movement and advancement of said slide automatically directly as the effective length of the tool engaged by said tool checking device becomes shorter.

6. In a machine tool of the type having an advanceable and retractable tool carrying slide;

a support for mounting a tool of the type used by said slide;

a movable tool checking device including a tool sensing element and a dial indicator operable by said element, said tool checking device being mounted with said sensing element over said support and being adjustable bodily to bring said element into engagement with a tool on said support at a predetermined pressure as registered by said dial indicator whereby to indicate the effective length of said tool;

an adjustable stop disposed in the path of travel of of said slide and engageable thereby to limit advancement thereof; and means for moving said tool checking device into and out of engagement with a tool on said support and operatively connected to said stop for adjustably moving the latter to control forward movement of said slide in accordance with the indicated length of said tool.

7. In a machine tool of the type having an advanceable and retractable tool carrying slide, means for controlling feed and traverse movements of said slide including an adjustable member for regulating the relative proportions of the feed and traverse movements;

a stationary support means for mounting a tool of the type used by the slide;

a movable tool checking device including a tool sensing element and a dial indicator operable by said element, said tool checking device being mounted with said sensing element over said support and being adjustable bodily to bring said element into engagement with a tool on said support at a predetermined pressure as registered by said dial indicator whereby to indicate the effective length of said tool;

an adjustable stop disposed in the path of travel of said slide and engageable thereby to limit advancement thereof; and means for moving said tool checking device into and out of engagement with a tool on said support, said last mentioned means being operatively connected to said adjustable member and to said stop for moving the same to regulate the feed and traverse movement of said slide and to control forward movement of the slide in accordance with the indicated length of said tool.

8. In a machine tool of the type having an advanceable and retractable tool carrying slide, a support for mounting a tool of the type used by said slide;

a movable tool checking device adjacent to said support and engageable with a tool disposed thereon for indicating the effective length of said tool;

an adjustable stop disposed in the path of travel of said slide and engageable thereby to limit advancement thereof;

a manual acuator; and cam means interacting between the manual actuator and said tool checking device and between said manual actuator and said stop responsive to operation of said actuator to move said tool checking device into or out of engagement with a tool on said support and simultaneously to advance or retract said stop to vary the amount of forward movement of said slide.

9. In a machine tool of the type having a base, and and advanceable and retractable tool carrying slide on said base, a support for mounting a tool of the type used by the slide;

a movable tool checking device including a tool sensing element and a dial indicator operable by said element, said tool checking device being mounted with said sensing element over said support and being adjustable bodily to bring said element into engagement with a tool on said support at a predetermined pressure as registered by said dial indicator whereby to indicate the effective length of said tool;

an adjustable stop carried by said base in the path of travel of said slide and engageable by the slide to limit advancement thereof;

a manual actuator; and cam means interacting between said manual actuator and said tool checking device and between said manual actuator and said stop responsive to operation of said actuator to move said tool checking device into or out of engagement with a tool on said support and simultaneously to advance or retract said stop to vary the amount of forward movement of said slide.

10. In a machine tool of the type having a stationary base, an advanceable and retractable tool carrying slide on said base, and means for controlling the feed and traverse movement of said slide including actuator means on and movable with said slide and fixed actuated means on said base, the improvement comprising a tool support on said base beside said slide for mounting a tool of the type used by the slide;

a movable tool checking device including a tool sensing element and a dial indicator operable by said element, said tool checking device being mounted with said sensing element over said support and being adjustable bodily to bring said element into or out of engagement with a tool on said support at a predetermined pressure as registered by said dial indicator whereby to indicate the effective length of said tool;

an adjustable stop carried by said base in the path of travel by said slide and engageable by the slide to limit advancement thereof;

a movable member interposed between said actuator means and said actuated means adjustable to regulate the feed and traverse movements of the slide;

a manual actuator; and cam means interacting between said manual actuator and said tool checking device, between said manual actuator and said stop and between said manual actuator and said movable member responsive to operation of said actuator to move said tool checking device into or out of engagement with a tool on said support and simultaneously to advance or retract said stop and said movable member to vary the extent of forward movement of said slide and directly proportionally vary the point in the travel of the slide at which the traverse movement of the slide ends and the feed movement of the slide begins.

No references cited.

WILLIAM W. DYER, Jr., *Primary Examiner.*